United States Patent
Parvanov et al.

(10) Patent No.: US 10,608,990 B2
(45) Date of Patent: Mar. 31, 2020

(54) ACCESSING NODES DEPLOYED ON AN ISOLATED NETWORK

(71) Applicant: NICIRA, INC., Palo Alto, CA (US)

(72) Inventors: Teodor Parvanov, Sofia (BG); Antony Stefanov, Sofia (BG)

(73) Assignee: NICIRA, INC., Palo Alto, CA (US)

( * ) Notice: Subject to any disclaimer, the term of this patent is extended or adjusted under 35 U.S.C. 154(b) by 496 days.

(21) Appl. No.: 15/351,459

(22) Filed: Nov. 15, 2016

(65) Prior Publication Data

US 2018/0139175 A1  May 17, 2018

(51) Int. Cl.
| | | |
|---|---|---|
| *H04L 29/06* | (2006.01) | |
| *H04L 29/12* | (2006.01) | |
| *H04L 29/08* | (2006.01) | |
| *H04L 12/24* | (2006.01) | |

(52) U.S. Cl.
CPC ......... *H04L 63/0209* (2013.01); *H04L 41/04* (2013.01); *H04L 61/1511* (2013.01); *H04L 61/256* (2013.01); *H04L 61/2514* (2013.01); *H04L 63/0263* (2013.01); *H04L 67/02* (2013.01); *H04L 67/10* (2013.01)

(58) Field of Classification Search
CPC ............. H04L 63/0209; H04L 63/0263; H04L 41/0803; H04L 41/22; H04L 61/1511; H04L 61/2514; H04L 61/256; H04L 67/02
See application file for complete search history.

(56) References Cited

U.S. PATENT DOCUMENTS

| | | | | |
|---|---|---|---|---|
| 9,369,302 B1* | 6/2016 | Dickinson | ........... | H04L 41/0896 |
| 9,628,294 B1* | 4/2017 | Brandwine | ......... | H04L 12/4641 |
| 9,736,185 B1* | 8/2017 | Belamaric | ............... | H04L 63/20 |
| 2001/0034847 A1* | 10/2001 | Gaul, Jr. | ............. | H04L 63/1433 |
| | | | | 726/25 |
| 2011/0302647 A1* | 12/2011 | Bhattacharya | ...... | H04L 63/0263 |
| | | | | 726/11 |
| 2013/0291068 A1* | 10/2013 | Huang | .................. | G06F 9/5072 |
| | | | | 726/4 |
| 2015/0058967 A1* | 2/2015 | Ringdahl | ............ | H04L 63/0254 |
| | | | | 726/11 |
| 2015/0082417 A1* | 3/2015 | Bhagwat | ............. | H04L 63/0263 |
| | | | | 726/13 |
| 2016/0057166 A1* | 2/2016 | Chesla | .................... | H04L 63/02 |
| | | | | 726/23 |
| 2016/0072764 A1* | 3/2016 | Arshinov | ............ | H04L 61/1511 |
| | | | | 709/245 |
| 2016/0234161 A1* | 8/2016 | Banerjee | ................. | H04L 67/10 |
| 2017/0093790 A1* | 3/2017 | Banerjee | ............. | H04L 61/2007 |

* cited by examiner

*Primary Examiner* — Hee K Song
(74) *Attorney, Agent, or Firm* — Su IP Consulting (57) ABSTRACT

Example methods and systems are provided for a management entity on a first network to access a node deployed on a second network that is isolated from the first network. The method may include assigning a first network address to the node, the first network address being a transient network address for the management entity to access the node temporarily from the first network. The method may further include configuring a firewall that isolates the second network from the first network to translate the first network address to a second network address; and performing a remoting operation by accessing the node at the first network address via the firewall. The node is accessible through the firewall translating the first network address to the second network address.

21 Claims, 7 Drawing Sheets

Mapping Information Table (at Automation System) 400

| FQDN of node 402 | Assigned transient IP address 404 | |
|---|---|---|
| server-A.mycompany.com | 10.10.10.201 | ~ 410 |
| server-B.mycompany.com | 10.10.10.202 | ~ 420 |
| server-C.mycompany.com | 10.10.10.203 | ~ 430 |

Fig. 4A

DNAT Rule Table (at Firewall) 450

| Transient IP address 452 | Internal IP address 454 | |
|---|---|---|
| 10.10.10.201 | 192.168.0.201 | ~ 460 |
| 10.10.10.202 | 192.168.0.202 | ~ 470 |
| 10.10.10.203 | 192.168.0.203 | ~ 480 |

ACCESSING NODES DEPLOYED ON AN ISOLATED NETWORK

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through hardware virtualization, virtual machines (e.g., referred to as "nodes") running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. To manage various nodes in the virtualized computing environment, a management entity requires access to the nodes, such as for configuring the nodes after a provisioning and deployment phase. However, in practice, the nodes are not always accessible, such as when deployed on an isolated network.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to accessing nodes deployed on an isolated network will now be explained in more detail using FIG. 1, which is a schematic diagram illustrating example virtualized computing environment 100 in which a management entity requires access to various nodes. It should be understood that, depending on the desired implementation, virtualized computing environment 100 may include additional and/or alternative components than that shown in FIG. 1. In the following, various examples will be discussed using automation system 110 as an example "management entity."

Figure 1:
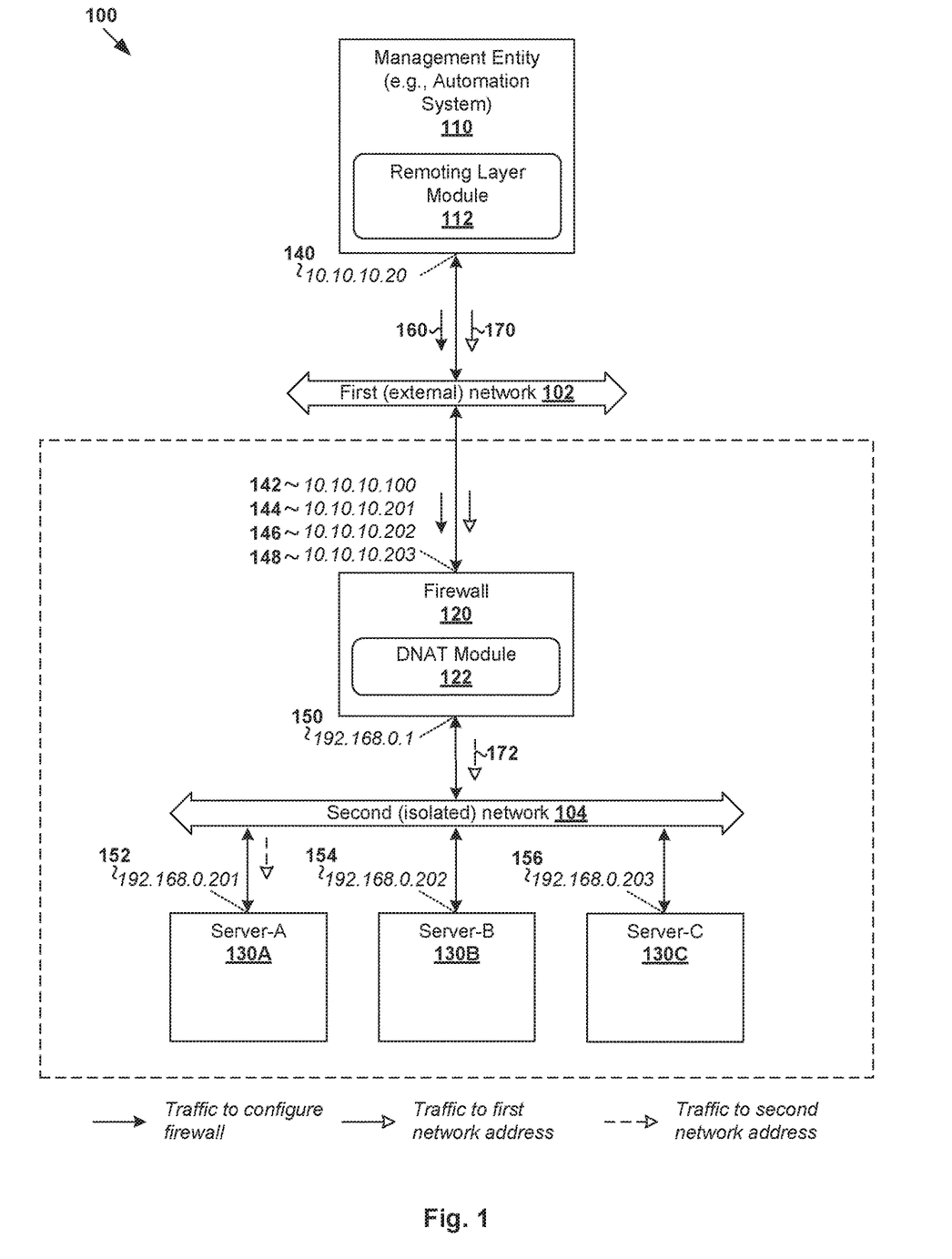
FIG. 1 is a schematic diagram illustrating an example virtualized computing environment in which a management entity requires access to various nodes.

In the example in FIG. 1, virtualized computing environment 100 includes automation system 110 that is responsible for managing multiple nodes, such as server-A 130A, server-B 130B, server-C 130C. For example, server-A 130A, server-B 130B, server-C 130C may be part of a multi-node application cluster, in which case a load balancer is usually used to distribute traffic among the nodes. As used herein, the term "node" or "node" may refer generally to a machine to which direct or individual access (e.g., not via the load balancer) by automation system 110 is required. Each server 130A/130B/130C may be a virtual machine (e.g., virtual server), physical machine (e.g., physical host), etc.

It should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

In practice, an example of automation system 110 is the VMware vRealize® Orchestrator™ available from VMware, Inc. In practice, the functionality of the VMware vRealize Orchestrator is leveraged by the VMware vRealize® Automation™ (also available from VMware, Inc.) for executing cloud automation workflows. In this case, automation system 110 includes a number of components (not shown for simplicity), such as (a) scheduler, (b) test execution system, (c) user interface (UI), (d) reporting service, etc. For example, (a) the scheduler is for orchestrating workflows relating to deployment, configuration, and test validation on the nodes; (b) the test execution system to execute and report the outcome of test cases; (c) the UI to schedule workflows and display execution status; and (d) the reporting service for providing real-time data for workflow executions. In practice, automation system 110 may be implemented using one or more physical and/or virtual machines.

Conventionally, automation system 110 usually resides on the same network as server-A 130A, server-B 130B and server-C 130C. This provides automation system 110 with direct access to server-A 130A, server-B 130B and server-C 130C, such as using their respective Fully Qualified Domain Names (FQDNs). An FQDN includes a list of domain labels representing a hierarchy from a lowest level of a Domain Name System (DNS) to a top-level domain (TLD). For example, FQDN="server-A.mycompany.com" uniquely identifies server-A 130A, where "server-A" represents its hostname and "mycompany.com" its parent domain name. In this case, when server-A 130A is accessed by automation system 110, its FQDN is automatically resolved into a numerical Internet Protocol address, such as using a Domain Name System (DNS) server (not shown for simplicity).

However, once deployed on an internal isolated network, server-A 130A, server-B 130B and server-C 130C cannot be accessed directly by automation system 110 from an external network (e.g., management network). In the example in FIG. 1, automation system 110 is on an external network labelled as "first network" 102, while server-A 130A, server-B 130B and server-C 130C are deployed on an isolated network labelled as "second network" 104. Firewall 120 acts as a gateway or security boundary that isolates, and limits access to, server-A 130A, server-B 130B and server-C 130C. In practice, second network 104 may represent a software-defined network such as Virtual eXtensible Local Area Network (VxLAN), Virtual LAN (VLAN), etc. The terms "external" and "internal" are generally from the perspective of the node (e.g., server 130A/130B/130C) to which access is required.

As used herein, the term "isolated" or "isolation" may refer generally to layer-3 isolation provided by firewall 120, which renders node 130A/130B/130C not routable from first network 102 because they do not have any external interface accessible by automation system 110. The term "layer-3" refers to a network layer in the Open System Interconnection (OSI) model, although the concepts described herein may be used with other networking models. In one example, firewall 120 may be a non-personal, software-defined firewall that provides services such as network address translation (NAT), secure NAT (SNAT), routing, load balancing, security policy enforcement, etc. Firewall 120 may be any implemented using any suitable physical and/or virtual machine(s). Through network virtualization technology (e.g., VMware NSX® from VMware, Inc.), firewall 120 may be implemented in a distributed manner.

Since server-A 130A, server-B 130B and server-C 130C are deployed on second network 104 that is isolated from first network 102, they are not directly accessible by automation system 110. This is problematic because automation system 110 will not be able to access server-A 130A, server-B 130B and server-C 130C individually from first network 102 for various purposes once they are deployed on second network 104.

Transient Network Addresses

According to examples of the present disclosure, transient network addresses (e.g., transient IP addresses) are assigned to server-A 130A, server-B 130B and server-C 130C to facilitate temporary access by automation system 110. This allows automation system 110 to access server-A 130A, server-B 130B and server-C 130C individually to perform various remoting operations relating to cloud automation, such as configuration, testing, validation, monitoring, update or upgrade, log collection, troubleshooting, etc.

Figure 2:
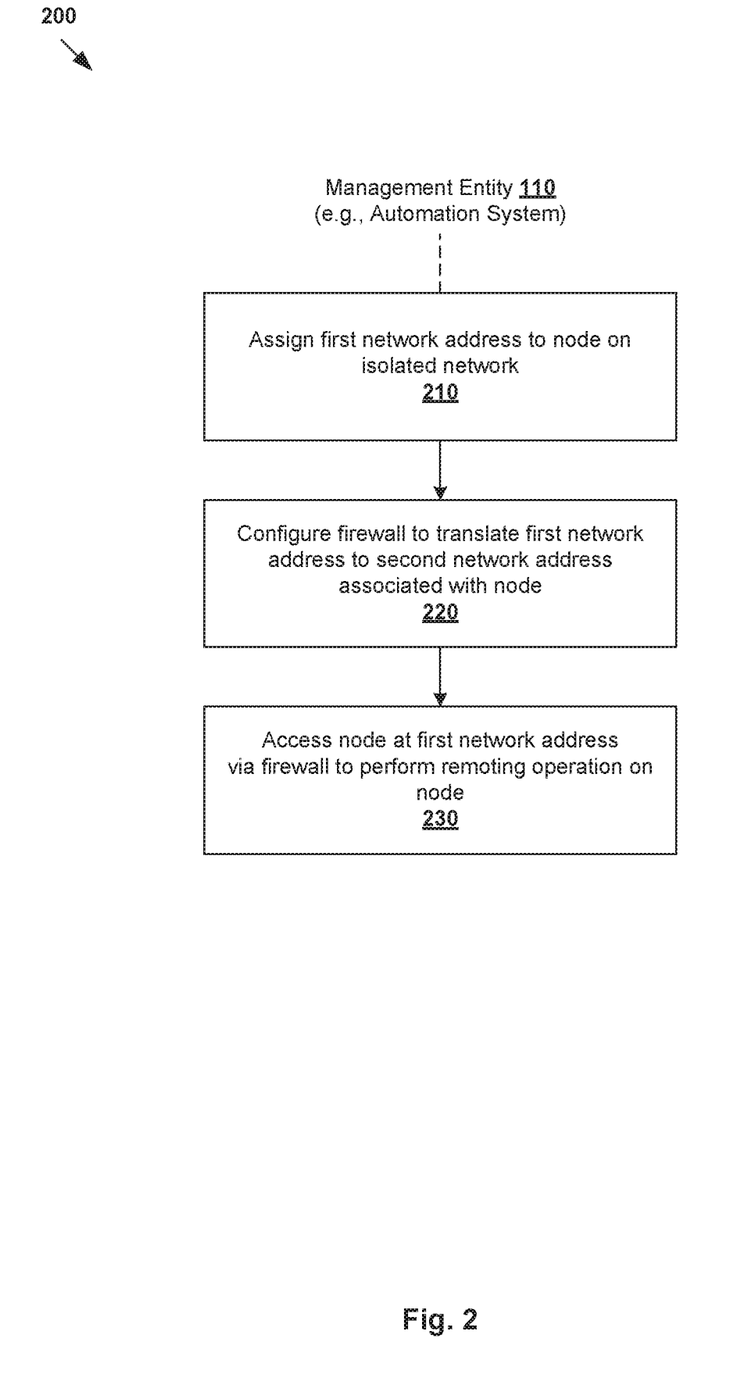
FIG. 2 is a flowchart of an example process for a management entity on a first network to access a node deployed on a second network.

In more detail, FIG. 2 is a flowchart of example process 200 for management entity 110 on first network 102 to access node 130A/130B/130C deployed on second network 104. Example process 200 may include one or more operations, functions, or actions illustrated by one or more blocks, such as 210 to 230. The various blocks may be combined into fewer blocks, divided into additional blocks, and/or eliminated depending on the desired implementation. In the following, server-A 130A will be used as an example "node" and automation system 110 as an example "management entity." Automation system 110 may implement example process 200 using remoting layer component 112, etc.

At 210 in FIG. 2, automation system 110 assigns a first network address to server-A 130A, the first network address being a transient network address for automation system 110 to access server-A 130A from first network 102. In one example, the assignment may involve automation system 110 configuring a pool of transient network addresses for temporary access to multiple nodes on second network 104. In this case, the first network address=10.10.10.201 (see 144 in FIG. 1) may be retrieved from the pool when access is required, and released into the pool when access is not required.

At 220 in FIG. 2, automation system 110 configures firewall 120 to translate the first network address to a second network address of server-A 130A. For example in FIG. 1, second network address=198.168.0.201 (see 152 in FIG. 1) identifies server-A 130A on second network 104 and is not exposed (i.e., unknown) to automation system 110 through the isolation by firewall 120. In the example in FIG. 1, traffic relating to the configuration of firewall 120 is shown at 160.

In one example, the configuration at 220 in FIG. 2 may take advantage of the NAT feature of software-defined firewall 120. In this case, automation system 110 may configure firewall 120 by invoking an application programming interface (API) call supported by firewall 120 (e.g., using DNAT module 122) to create a destination network address translation (DNAT) rule that associates first network address=10.10.10.201 with second network address=198.168.0.201. The software-defined aspect of firewall 120 allows for easy integration with automation system 110 when setting up a SDDC, such as for design, proof-of-concept and quality engineering purposes.

At 230 in FIG. 2, automation system 110 performs a remoting operation by accessing server-A 130A at the first network address=10.10.10.201 via configured firewall 120. Based on the configuration at 220 in FIG. 2, server-A 130A is accessible through firewall 120 translating the first network address to the second network address. In the example in FIG. 1, traffic relating to the remoting operation that is shown at 170 (i.e., before translation) and 172 (i.e., after translation).

As used herein, the term "remoting operation" may refer generally to any suitable operation, task, workflow, function, etc., capable of being remotely triggered and controlled by automation system 110 on a node, such as by executing remote commands (e.g., shell commands) on the node, invoking API calls on the node, performing web-based user interface operations supported by the node, etc. As will be described further using FIG. 5, automation system 110 may perform the remoting operation to facilitate one or more of the following: automated configuration of the node; automated testing of the node; automated update or upgrade of the node; log collection from the node; monitoring of the node; and troubleshooting of the node Examples of the present disclosure should be contrasted against conventional approaches that necessitate the addition of an external interface on each node for access by automation system 110. Such approaches usually involve complex configuration steps that require administrative access to second network 104 (which is not always available). Also, security threats may increase because firewall 120 will be bypassed with the addition of the external interface. Further, examples of the present disclosure should be contrasted against conventional approaches that necessitate the addition of a logical router to facilitate direct access to the node. Such approaches usually do not scale well and require administrative access to second network 104 to, for example, perform additional manual routing configuration.

Using examples of the present disclosure, administrative access to second network 104 is not required. The assignment of the first network address by automation system 110 and translation into the second network address by firewall 120 may be performed in a transparent manner to the node. In some examples, configuration of firewall 120 may be automated using API calls. This improves scalability, especially for production-scale environments that include a large number of nodes.

In practice, examples of the present disclosure may be used with any suitable technology relating to automated deployment of Software Defined Data Center (SDDC). For example, VMware Validated Designs (VVDs) from VMware, Inc. provide a set of blueprints and guidelines for validating and integrating different products. This technology enables an organization to automate the provisioning of repeatable requests and to respond to business needs with more agility and predictability. This way, security, availability and modularity of key SDDC functional components (e.g., production operations, cloud automation services, etc.), as well as disaster recovery, may be improved in virtualized computing environment 100.

Instead of "flat deployments" that deploy all SDDC components on a single management network, the VVDs recommend deployment of certain components in isolated, load-balanced software-defined networks. For example in FIG. 1, automated system 110 may automatically deploy server-A 130A, server-B 130B and server-C 130C in a virtual pod (see box in dotted line in FIG. 1) according to VVDs. Once deployed, automated system 110 may access each node individually using its assigned transient IP address. Examples of the present disclosure may be implemented to access nodes in the context of any load-balanced application that needs to be automatically deployed, configured, scaled-up or upgraded within a virtualized cloud environment.

In the following, various examples will be explained using FIGS. 3 to 7. In particular, a transient IP address assignment phase will be explained using FIGS. 3, 4A and 4B; an access phase using FIG. 5; and a transient IP address release phase using FIG. 6; and an example implementation of automation system 110 using FIG. 7.

Transient IP Address Assignment Phase

Figure 3:
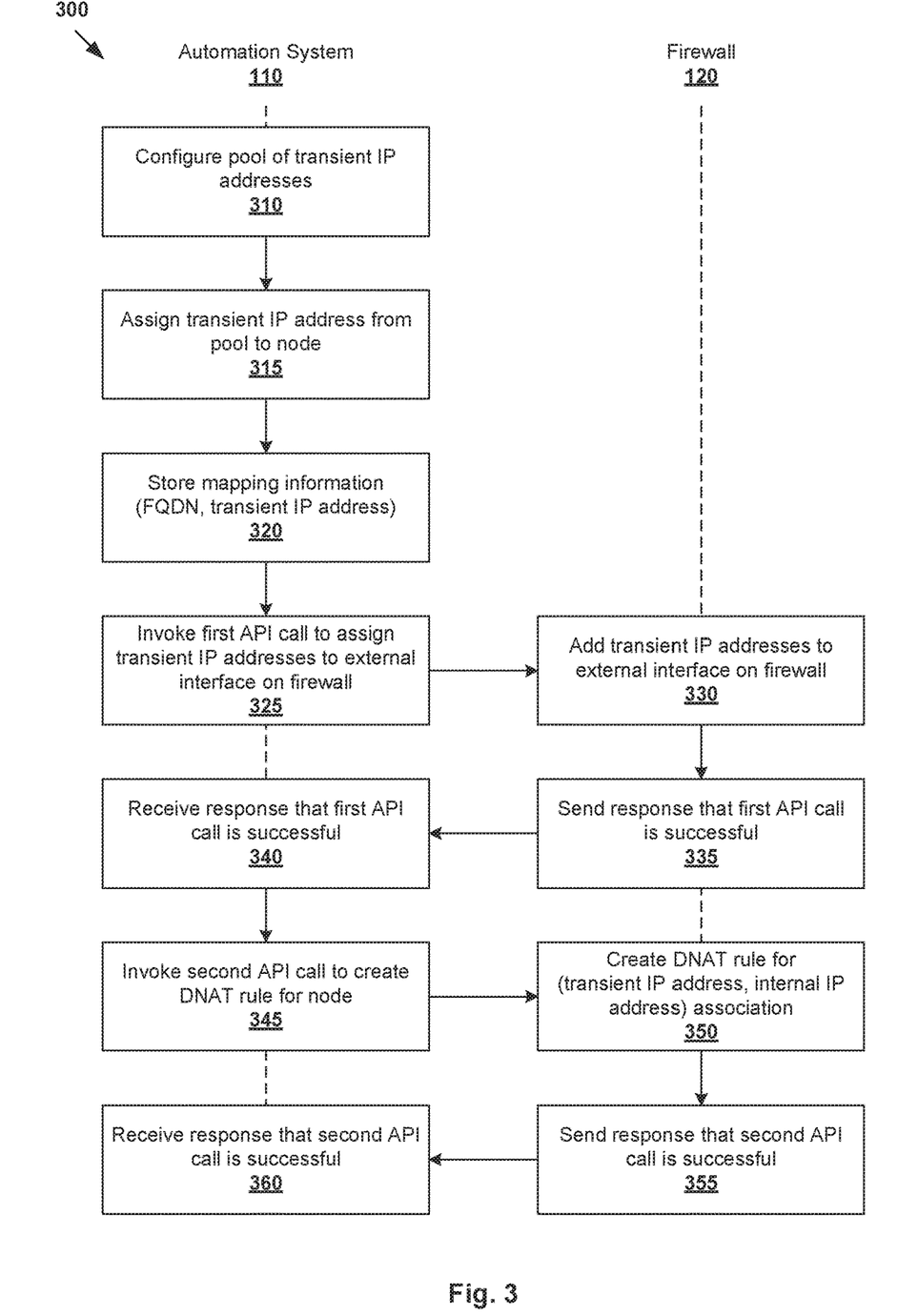
FIG. 3 is a flowchart of an example process to implement a transient IP address assignment phase according to the example in FIG. 2.

FIG. 3 is a flowchart of example process 300 to implement a transient IP address assignment phase according to the example in FIG. 2. Example process 300 may include one or more operations, functions, or actions illustrated by one or more blocks, such as 310 to 360. The various blocks may be combined into fewer blocks, divided into additional blocks, and/or eliminated depending on the desired implementation. In the example in FIG. 1, example process 300 may be implemented by automation system 110 using remoting layer module 112, and firewall 120 using DNAT module 122.

Referring first to 310 in FIG. 3, automation system 110 configures a pool of transient IP addresses to facilitate temporary access to multiple nodes. For example in FIG. 1, automation system 110 has an external interface with IP address=10.10.10.20 (see 140) and configures the pool to include the following transient IP addresses to access server-A 130A, server-B 130B and server-C 130C: 10.10.10.201, 10.10.10.202 and 10.10.10.203.

At 315 and 320 in FIG. 3, automation system 110 retrieves a transient IP address from the pool configured at 310 to assign it to a node, and stores mapping information between the node and its assigned transient IP address.

Figure 4A:
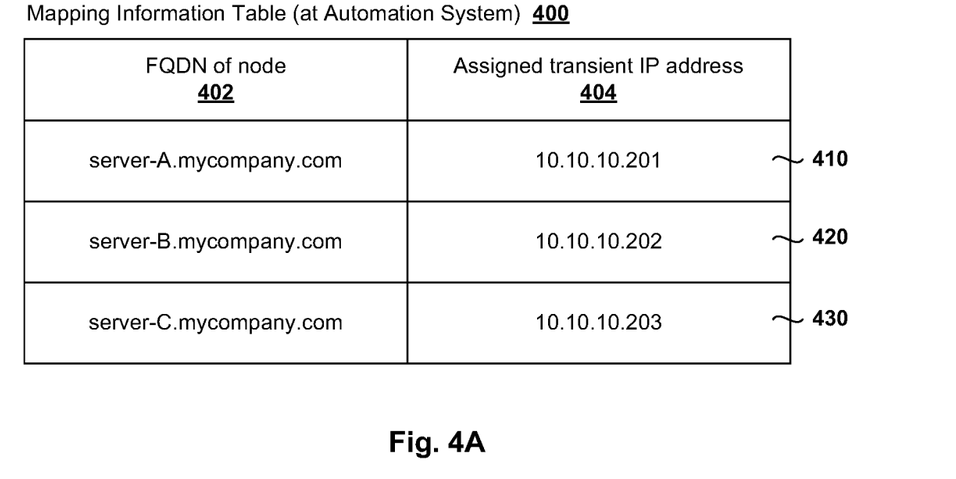
FIG. 4A illustrates an example mapping information table maintained by a management entity.

FIG. 4A illustrates example mapping information table 400 maintained by management entity 110. First entry 410 is created for server-A 130A to store the mapping between its assigned transient IP address=10.10.10.201 and FQDN="server-A.mycompany.com." Second entry 420 is created for server-B 130B to store the mapping between transient IP address=10.10.10.202 and FQDN="server-B.mycompany.com." Third entry 430 is created for server-C 130C to store the mapping between transient IP address=10.10.10.203 and FQDN="server-C.mycompany.com." Mapping information table 400 is used to resolve an FQDN to its associated transient IP address when a particular node 130A/130B/130C is accessed.

At 325 in FIG. 3, automation system 110 invokes a first API call to assign the transient IP addresses to (i.e., associated with) an external interface of firewall 120, such as the external interface with external IP address=10.10.10.100 (see 142 in FIG. 1). At 330 in FIG. 3, in response to the first API call, firewall 120 adds or assigns the transient IP addresses 10.10.10.201 (see 144 in FIG. 1), 10.10,10.202 (see 146 in FIG. 1) and 10.10.10.203 (see 148 in FIG. 1) to that external interface. This way, future traffic addressed to the transient IP addresses is sent via that external interface to reach their respective destinations via firewall 120. At 335 and 340 in FIG. 3, firewall 120 informs automation system 110 that the first API call is successfully invoked, which indicates that the transient IP addresses have been added.

At 345 and 350 in FIG. 3, automation system 110 configures firewall 120 to translate a transient IP address ("first network address") assigned to a node and its internal IP address ("second network address"). For example, automation system 110 may invoke a second API call supported by firewall 120 to create a DNAT rule that associates the transient IP address with the internal IP address of a node. At 355 and 360 in FIG. 3, firewall 120 informs automation system 110 that the second API call is successfully invoked, which indicates that the relevant DNAT rule(s) have been created. Although two separate API calls are invoked in the example in FIG. 3, it should be understood that the API calls may be combined into a single API call, if supported by firewall 120.

Figure 4B:
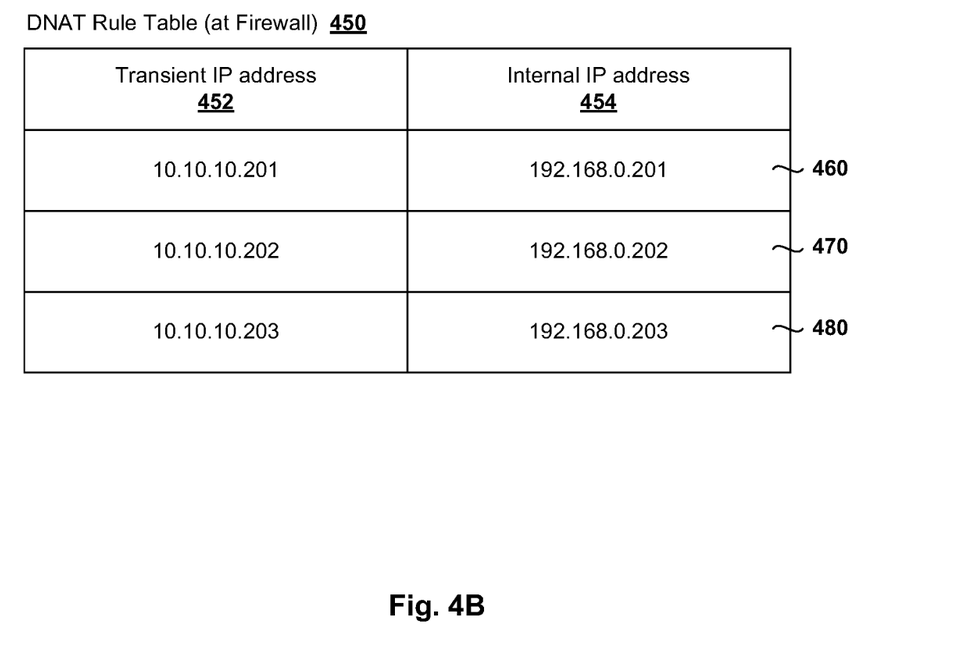
FIG. 4B illustrates an example destination network address translation (DNAT) rule table maintained by a firewall.

FIG. 4B illustrates example DNAT rule table 450 maintained by firewall 120. First DNAT rule 460 is created to associate transient IP address=10.10.10.201 (see 144 in FIG. 1) with internal IP address=192.168.0.201 (see 152 in FIG. 1) of server-A 130A. Second DNAT rule 470 is created to associate transient IP address=10.10.10.202 (see 146 in FIG. 1) with internal IP address=192.168.0.202 (see 154 in FIG. 1) of server-B 130B. Third DNAT rule 480 is created to associate transient IP address=10.10.10.203 (see 148 in FIG. 1) with internal IP address=192.168.0.203 (see 156 in FIG. 1) of server-C 130C. Using DNAT rule table 450, traffic addressed to a transient IP address will be translated by firewall 120 to its associated internal IP address.

Access Phase

Figure 5:
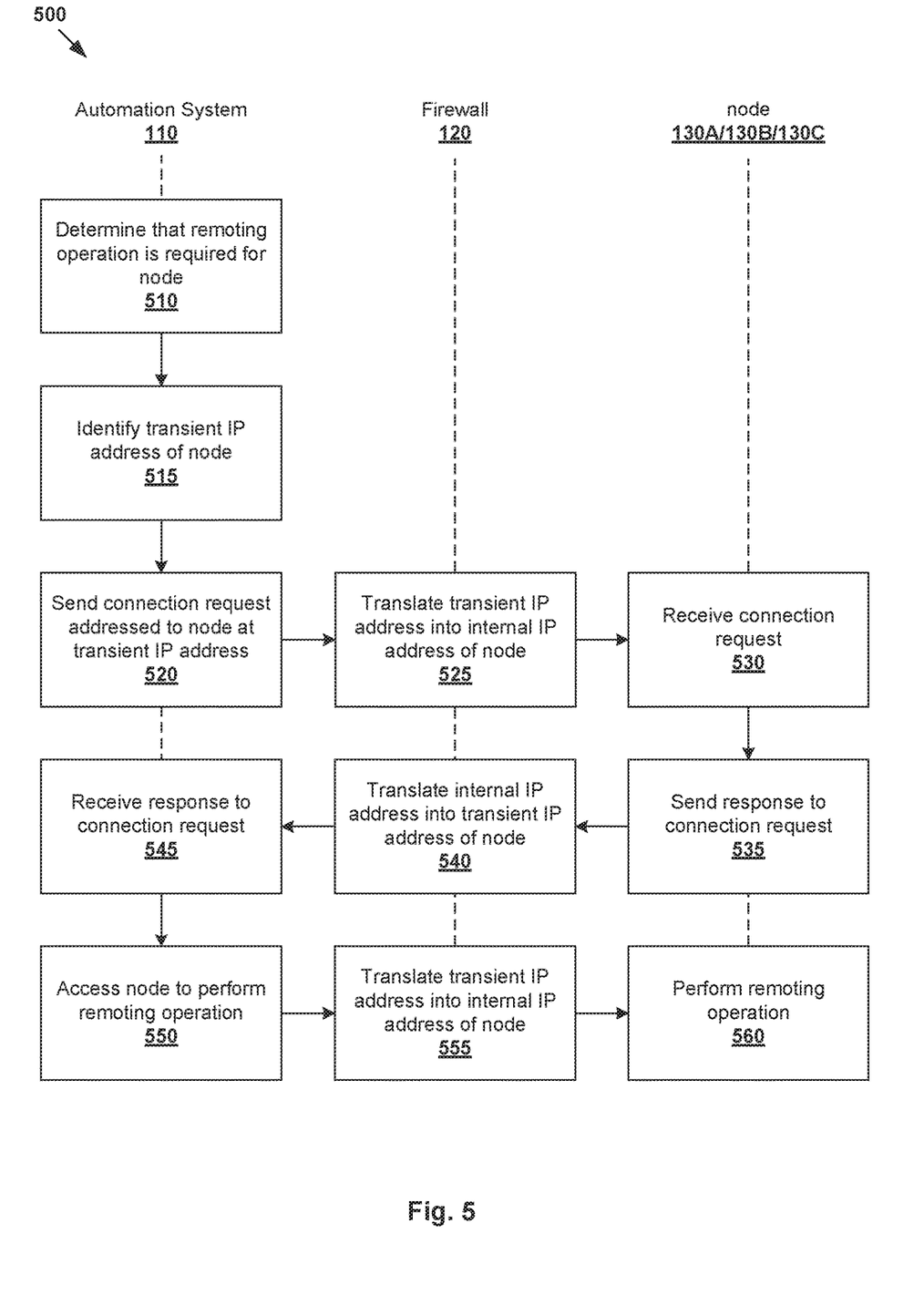
FIG. 5 is a flowchart of an example process to implement an access phase according to the example in FIG. 2.

FIG. 5 is a flowchart of example detailed process 500 to implement an access phase according to the example in FIG. 2. Example process 500 may include one or more operations, functions, or actions illustrated by one or more blocks, such as 510 to 560. The various blocks may be combined into fewer blocks, divided into additional blocks, and/or eliminated depending on the desired implementation. In the example in FIG. 1, example process 500 may be implemented by automation system 110 using remoting layer module 112, and firewall 120 using DNAT module 122.

At 510 and 515 in FIG. 5, in response to determining that a remoting operation is required for a node, automation system 110 identifies a transient IP address assigned to node. Using server-A 130A as an example, its transient IP address=10.10.10.201 may be identified based on FQDN="server-A.mycompany.com" according to first entry 410 in FIG. 4A.

At 520 in FIG. 5, automation system 110 sends a connection request to server-A 130A at its assigned transient IP address via firewall 120. At 525 in FIG. 5, firewall 120 receives the connection request via its external interface with IP address=10.10.10.100 (see 142 in FIG. 1). In response, automation system 110 translates the destination IP address=10.10.10.201 (i.e., transient IP address of server-A 130A) to internal IP address=192.168.0.201 according to first DNAT rule 460 in FIG. 4B. The connection request is then forwarded to server-A 130A via an internal interface of firewall 120 with IP address=198.168.0.1 (see 150 in FIG. 1).

At 530 and 535 in FIG. 5, server-A 130A receives the connection request, and sends a response accordingly. At 540 in FIG. 5, firewall 120 translates the source IP address in the response, being the internal IP address=192.168.0.201 of server-A 130A, to its corresponding transient IP address=10.10.10.201. In practice, any suitable request-response protocol may be used for the connection request and response, such as Hypertext Transfer Protocol (HTTP), etc. In this case, a Transmission Control Protocol (TCP) connection may be established between automation system 110 and Server-A 130A for exchanging requests and responses.

At 545 and 550 in FIG. 5, in response to receiving the connection response, automation system 110 proceeds to perform a remoting operation on server-A 130A by accessing server-A 130A at its transient IP address. At 555 in FIG. 5, firewall 120 translates transient IP address=10.10.10.201 of server-A 130A to internal IP address=192.168.0.201 according to first DNAT rule 460 in FIG. 4B. At 560 in FIG. 5, server-A 130A performs the remoting operation under the control of automation system 110.

In practice, the remoting operation may be performed to facilitate cloud automation tasks relating to the following: automated configuration; automated testing (e.g., white-box or grey-box); automated update or upgrade; log collection; monitoring; troubleshooting, etc. The remoting operation may involve automation system 110 performing the following on the node: executing remote shell command(s), invoking API call(s), performing web-based UI operations, etc. For example, in relation to configuration automation, automation system 110 may orchestrate execution of configuration tasks by the node. In relation to test automation, automation system 110 acts as a test agent to contact a node on isolated network 104 for test case setup, verifications, etc. In relation to update or upgrade automation, automation system 110 accesses a node to install, for example, a software patch on the node.

Any suitable protocol may be used to perform the remoting operation, such as Telnet, Secure Shell (SSH), etc. For example, Telnet is an application-layer protocol that provides a means for a local machine (e.g., automation system 110) to access a remote machine (e.g., server-A 130A) as if they were locally connected. For example, in a remote configuration scenario, automation system 110 communicates configuration data and commands to server-A 130A during a Telnet session. SSH operates in a similar manner to Telnet, but with the addition of a user/password combination or public/private key authentication.

Although explained with reference to server-A 130A, example process 500 may be repeated for other nodes. For example, to improve efficiency, automation system 110 may access server-A 130A, server-B 130B and server-C 130C simultaneously to manage the multi-node application cluster. The remoting operations may be node-specific, in which case node-specific data and commands are sent to the particular node.

Transient IP Address Release Phase

Figure 6:
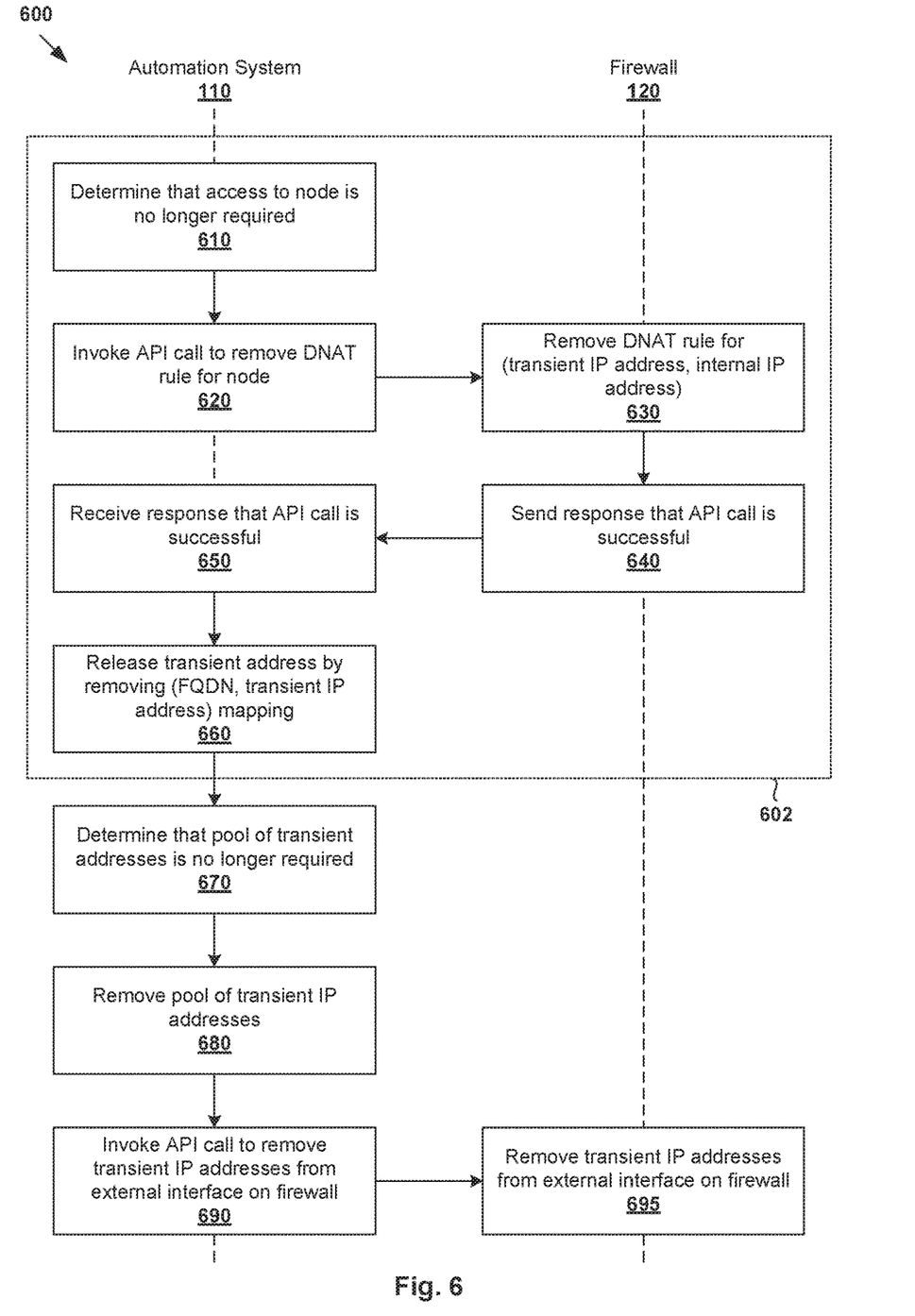
FIG. 6 is a flowchart of example process to implement a transient IP address release phase according to the example in FIG. 2.

FIG. 6 is a flowchart of example process 600 to implement a transient IP address release phase according to the example in FIG. 2. Example process 600 may include one or more operations, functions, or actions illustrated by one or more blocks, such as 610 to 695. The various blocks may be combined into fewer blocks, divided into additional blocks, and/or eliminated depending on the desired implementation. In the example in FIG. 1, example process 600 may be implemented by automation system 110 using remoting layer module 112, and firewall 120 using DNAT module 122.

In the example in FIG. 6, blocks 610 to 660 within dashed-line box 602 represent a repeatable sub-flow that may be performed by automation system 110 every time the release of a transient IP address is required. The released transient IP address may be re-assigned to a different node according to the example in FIG. 3. Blocks 670 to 695 (i.e., outside of box 602) represent a series of finalization steps that are performed when the pool of transient IP addresses is no longer required.

Referring first to 610 in FIG. 6, automation system 110 determines that access to a node is no longer required. For example, in relation to configuration automation, automation system 110 may determine that all node-specific configurations have been completed for server-A 130A in FIG. 1.

At 620 in FIG. 6, in response to determination that access to a node is no longer required, automation system 110 configures firewall 120 to disassociate a transient IP address from an internal IP address of a node. This may involve automation system 110 invoking an API call supported by firewall 120 to remove a DNAT rule. At 630, 640 and 650 in FIG. 6, firewall 120 removes the relevant DNAT rule(s) and informs automation system 110 that API call is successful.

In the example in FIG. 1, a transient IP address release or teardown phase may be performed once remoting operation(s) on server-A 130A, server-B 130B and server-C 130C are completed. Referring again to mapping information table 450 in FIG. 4B, invocation of the API call causes firewall 120 to remove first DNAT rule 460 relating to server-A 130A, second DNAT rule 470 for server-B 130B, and third DNAT rule 480 for server-C 130C. This way, automation system 110 can no longer access server-A 130A, server-B 130B and server-C 130C at respective transient IP addresses 10.10.10.201, 10.10.10.202 and 10.10.10.203.

At 660 in FIG. 6, automation system 110 releases a transient IP address into the pool (configured at 310 in FIG. 3) by removing the mapping between a node's FQDN and its assigned transient IP address. Referring again to example mapping information table 400 in FIG. 4A, automation system 110 removes first entry 410 relating to server-A 130A, second entry 420 relating to server-B 130B and third entry 430 relating to server-C 130C. The released transient IP addresses may be reused by assigning them to other nodes.

At 670 and 680 in FIG. 6, in response to determination that the pool of transient IP addresses is no longer required, automation system 110 may remove the entire pool, for example to reduce, if not avoid, the likelihood of IP address conflict. Further, at 690 and 695, automation system 110 may invoke an API call on firewall 120 to remove the transient IP addresses from an external interface of firewall 120. In the example in FIG. 1, this involves firewall 120 removing transient IP addresses 10.10.10.201 (see 144 in FIG. 1), 10.10.10.202 (see 146 in FIG. 1) and 10.10.10.203 (see 148 in FIG. 1) from the external interface.

Example Management Entity

Figure 7:
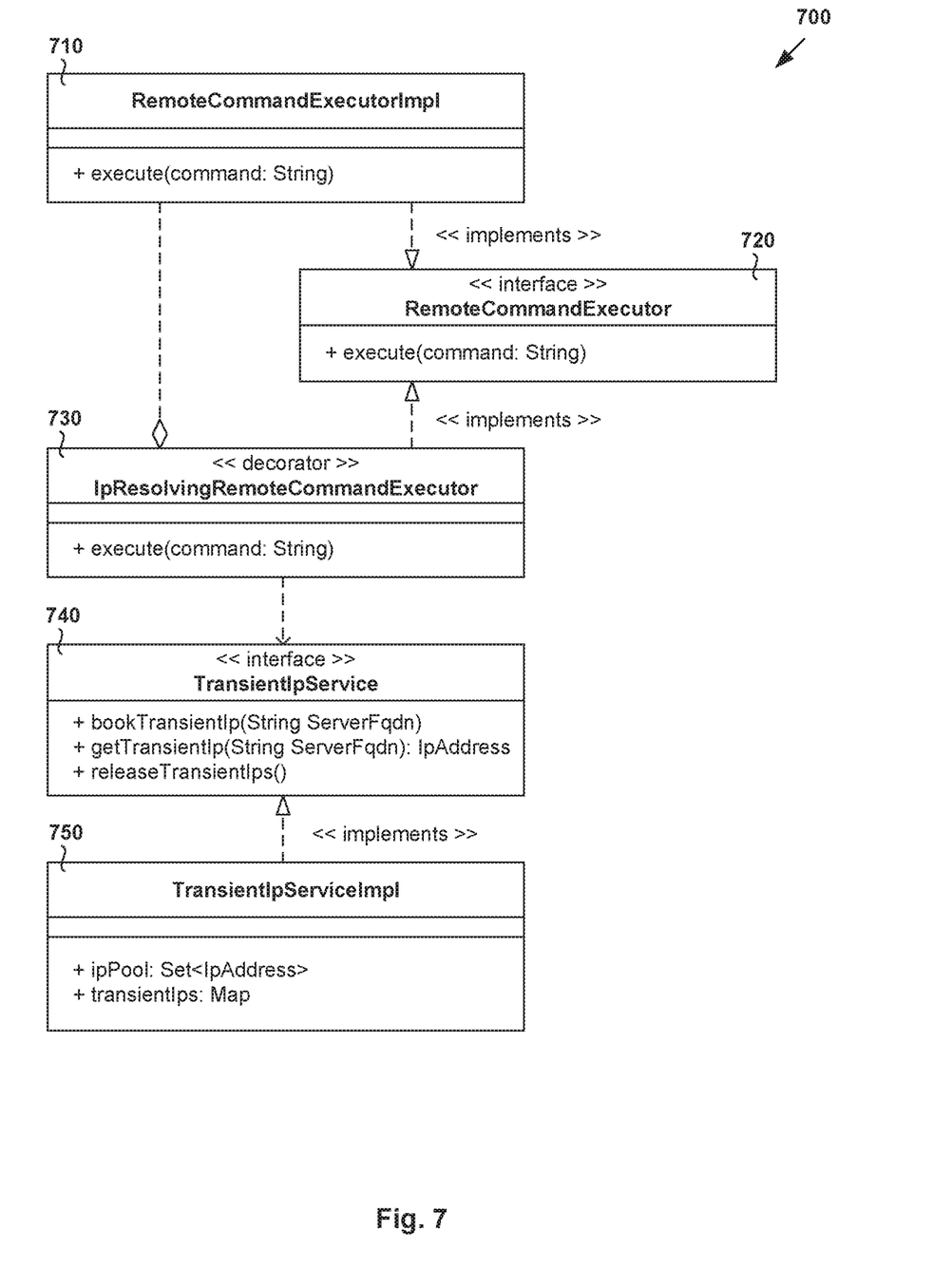
FIG. 7 is a Unified Modelling Language (UML) diagram illustrating an example implementation of a remoting layer module of a management entity.

FIG. 7 is a Unified Modelling Language (UML) diagram illustrating example implementation 700 of remoting layer module 112 of management entity 110. It should be understood that, depending on the desired implementation, management entity 110 (e.g., automation system in FIG. 1) may include additional and/or alternative components than that shown.

To implement the examples of the present disclosure, an existing automation system 110 may be modified to be able to configure firewall 120 to add or remove DNAT rules. Further, in order to abstract the mapping of the transient IP addresses to respective nodes, remoting layer components (e.g., API stubs, shell commands executors) may be "wrapped." The wrapping is to make the remoting layer components agnostic of the transient nature of the node's external IP address.

In the example in FIG. 7, a decorator pattern (i.e., a design pattern in object-oriented programming) is used to add a new functionality to an existing object, without affecting the behavior of other objects from the same class. In particular, component "RemoteCommandExecutor" 720 represents an interface or abstract class defining methods that will be implemented by component "RemoteCommandExecutorImpl" 710 to perform remoting operations. Component "IpResolvingRemoteCommandExecutor" 730 is a decorator class that implements "RemoteCommandExecutor" 720, and which adds the transient IP communication logic.

Component interface "TransientIpService" 740 is to manage the transient IP address reservation from a pool using the "bookTransientIp( )" method. The decorator pattern ensures that every time the "execute( )" method is called on "RemoteCommandExecutor" 720 to perform a remoting operation on a node, the FQDN of the node is replaced by its assigned transient IP address using the "getTransientIp( )" method of "TransientIpService" 740. Component "TransientIpServiceImpl" 750 implements "TransientIpService" 740 to maintain a pool of transient IP addresses and manage mapping information between nodes and assigned transient IP addresses.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIGS. 1 to 7. For example, a computer system capable of acting as automation system 110 or a physical host supporting node 130A/130B/130C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a management entity on a first network to access a node deployed on a second network that is isolated from the first network, wherein the method comprises:

assigning a first network address to the node, wherein the first network address is a transient network address for the management entity to access the node from the first network;

configuring a firewall that isolates the second network from the first network to translate the first network address to a second network address, wherein the second network address identifies the node on the second network performing a remoting operation by accessing the node at the first network address via the firewall, wherein the node is accessible through the firewall translating the first network address to the second network address; and in response to determination that the remoting operation is completed, configuring the firewall to disassociate the first network address from the second network address.

2. The method of claim 1, wherein configuring the firewall comprises:
invoking an application programming interface (API) call supported by the firewall to create a destination network address translation (DNAT) rule that associates the first network address with the second network address.

3. The method of claim 2, wherein the method further comprises:
invoking an API call supported by the firewall to remove the DNAT rule.

4. The method of claim 1, wherein assigning the first network address comprises:
configuring a pool of network addresses for multiple nodes deployed on the second network;
retrieving the first network address from the pool; and
storing a mapping between the first network address and a fully qualified domain name (FQDN) associated with the node.

5. The method of claim 4, wherein the method further comprises:
in response to determination that the remoting operation is completed, releasing the first network address into the pool by removing the mapping between the first network address and the FQDN.

6. The method of claim 1, wherein performing the remoting operation comprises:
performing the remoting operation to facilitate one or more of the following:
automated configuration of the node; automated testing of the node; automated update or upgrade of the node; log collection from the node; monitoring of the node; and troubleshooting of the node.

7. The method of claim 6, wherein performing the remoting operation comprises one or more of the following:
executing remote commands on the node; invoking API calls on the node; and performing web-based user interface operations on the node.

8. A non-transitory computer-readable storage medium that includes a set of instructions which, in response to execution by a processor of a management entity on a first network, cause the processor to perform a method of accessing a node deployed on a second network that is isolated from the first network, wherein the method comprises:
assigning a first network address to the node, wherein the first network address is a transient network address for the management entity to access the node temporarily from the first network;
configuring a firewall that isolates the second network from the first network to translate the first network address to a second network address, wherein the second network address identifies the node on the second network
performing a remoting operation by accessing the node at the first network address via the firewall, wherein the node is accessible through the firewall translating the first network address to the second network address; and
in response to determination that the remoting operation is completed, configuring the firewall to disassociate the first network address from the second network address.

9. The non-transitory computer-readable storage medium of claim 8, wherein configuring the firewall comprises:
invoking an application programming interface (API) call supported by the firewall to create a destination network address translation (DNAT) rule that associates the first network address with the second network address.

10. The non-transitory computer-readable storage medium of claim 9, wherein the method further comprises:
invoking an API call supported by the firewall to remove the DNAT rule.

11. The non-transitory computer-readable storage medium of claim 8, wherein assigning the first network address comprises:
configuring a pool of network addresses for multiple nodes on the second network;
retrieving the first network address from the pool; and
storing a mapping between the first network address and a fully qualified domain name (FQDN) associated with the node.

12. The non-transitory computer-readable storage medium of claim 11, wherein the method further comprises:
in response to determination that the remoting operation is completed, releasing the first network address into the pool by removing the mapping between the first network address and the FQDN.

13. The non-transitory computer-readable storage medium of claim 8, wherein performing the remoting operation comprises:
performing the remoting operation to facilitate one or more of the following: automated configuration of the node; automated testing of the node; automated update or upgrade of the node; log collection from the node; monitoring of the node; and troubleshooting of the node.

14. The non-transitory computer-readable storage medium of claim 13, wherein performing the remoting operation comprises one or more of the following:
executing remote commands on the node; invoking API calls on the node; and performing web-based user interface operations on the node.

15. A computer system on a first network configured to access a node deployed on a second network that is isolated from the first network, the computer system comprising:
a processor; and
a non-transitory computer-readable medium having stored thereon instructions that, when executed by the processor, cause the processor to:
assign a first network address to the node, wherein the first network address is a transient network address for the computer system to access the node temporarily from the first network;
configure a firewall that isolates the second network from the first network to translate the first network address to a second network address, wherein the second network address identifies the node on the second network
perform a remoting operation by accessing the node at the first network address via the firewall, wherein the node is accessible through the firewall translating the first network address to the second network address; and
in response to determination that the remotinq operation is completed, configure the firewall to disassociate the first network address from the second network address.

16. The computer system of claim 15, wherein the instructions for configuring the firewall cause the processor to:
  invoke an application programming interface (API) call supported by the firewall to create a destination network address translation (DNAT) rule that associates the first network address with the second network address.

17. The computer system of claim 16, wherein the instructions further cause the processor to:
  invoke a API call supported by the firewall to remove the DNAT rule.

18. The computer system of claim 15, wherein the instructions for assigning the first network address cause the processor to:
  configure a pool of network addresses for multiple nodes on the second network;
  retrieve the first network address from the pool; and
  store a mapping between the first network address and a fully qualified domain name (FQDN) associated with the node.

19. The computer system of claim 18, wherein the instructions further cause the processor to:
  in response to determination that the remoting operation is completed, release the first network address into the pool by removing the mapping between the first network address and the FQDN.

20. The computer system of claim 15, wherein the instructions for performing the remoting operation cause the processor to:
  perform the remoting operation to facilitate one or more of the following: automated configuration of the node; automated testing of the node; automated update or upgrade of the node; log collection from the node; monitoring of the node; and troubleshooting of the node.

21. The computer system of claim 20, wherein the instructions for performing the remoting operation cause the processor to perform one or more of the following:
  execute remote commands on the node; invoke API calls on the node; and
  perform web-based user interface operations on the node.

* * * * *